350-403 SR

XR 2,590,281

7 X 4035Y WP

March 25, 1952 G. C. SZIKLAI ET AL 2,590,281

TELEVISION FILM SCANNER

Filed Aug. 13, 1948 5 Sheets-Sheet 1

INVENTORS
GEORGE C. SZIKLAI
& ALDA V. BEDFORD
BY Olin V. Mitchell
ATTORNEY

2590281
OR IN 358/214

INVENTORS
GEORGE C. SZIKLAI
& ALDA V. BEDFORD
BY
Olin V. Mitchell
ATTORNEY

TELEVISION FILM SCANNER

Filed Aug. 13, 1948 5 Sheets-Sheet 3

INVENTORS
GEORGE C. SZIKLAI
& ALDA V. BEDFORD
BY Olin V. Mitchell
ATTORNEY

INVENTORS
GEORGE C. SZIKLAI
& ALDA V. BEDFORD
BY
Olin V. Mitchell
ATTORNEY

INVENTORS
GEORGE C. SZIKLAI
& ALDA V. BEDFORD
BY Olin V. Mitchell
ATTORNEY

Patented Mar. 25, 1952 2,590,281

UNITED STATES PATENT OFFICE 2,590,281

TELEVISION FILM SCANNER

George C. Sziklai and Alda V. Bedford, Princeton, N. J., assignors to Radio Corporation of America, a corporation of Delaware Application August 13, 1948, Serial No. 43,986

17 Claims. (Cl. 178—7.2)

This invention relates to television scanning systems for motion picture film and particularly to methods of film scansion wherein the film is scanned while in continuous motion.

The use of motion picture film as a source of television program material is becoming more and more popular as the art progresses. One of the many advantages to be derived from the use of standard motion picture film resides in its great flexibility which includes permissible editing of the material to be televised prior to its transmission, and hence obviating any awkward situation arising from the release to the public of undesirable information. Furthermore, the use of properly edited photographically recorded television program material in motion picture film form in cooperation with the development of more rapid transportation facilities opens avenues of approach to one form of practical television network requiring no expensive and elaborate interstation television signal transmitting relay equipment or coaxial line systems.

Since the standards of the motion picture film industry requires the reproduction of most commercial motion picture films at a rate of 24 frames per second, whereas the frame presentation rate of RMA standard television systems is 30 frames per second, some means must be employed to resolve the 24-frame per second reproduction of the motion picture film to the 30-frame transmission characteristic of present day television systems. A number of methods for accomplishing this resolution have been proposed a few of which are discussed by E. W. Engstrom, G. C. Beers and A. V. Bedford in an article entitled "Application of motion picture film to television," Journal of the Society of Motion Picture Engineers, July 1930. Other projection schemes of this type are discussed by Fordyce Tuttle and Charles D. Reid in the "Problem of motion picture projection from continuously moving film," in Journal of the Society of Motion Picture Engineers, February 1932. However, each method presently known to the art exhibits certain limitations which leave considerable room for improvement in television film scanning systems.

Generally speaking, the film scanning schemes now known may be subdivided into two categories, namely that where the film is intermittently moved during scansion as in its most common form of optical theatre projection and that system wherein the film is scanned while in continuous motion, referred to as the non-intermittent type of projection. Although the present invention concerns itself more particularly with the latter non-intermittent type of film scansion, its principles may be applied to intermittent type of film scanning apparatus with the possible lending of operational advantages thereto.

The process of projecting a stationary frame image from a uniformly moving picture film is known as optical rectification. In certain well known methods of optical rectification finding use in film scanning devices the rectification is accomplished by appropriately moving lenses between the moving film strip and a stationary projection lens, the lenses being of a conventional type and passed between the film and lens in a direction transverse to the axis of the lens and a line perpendicular to the plane of the film. A moving lens produces a virtual image of an associated frame on the film strip that moves in accordance with the lens motion. At the same time the motion of the film strip itself causes a second motion to be imparted to the image. The moving lens is so designed and displaced in relation to the moving film strip that these two motions of the images are rendered equal and opposite in direction. As a result a stationary image or successive superimposed stationary images of one or more frames of the moving film strip is presented to the projection lens and the image of the film frame is held stationary on the screen or television scanning mosaic on which the image is projected. In its most practical form such a device designed to resolve 24 frame per second motion picture film projection to 30 frame per second television transmission comprises a wheel rotating at about 30 R. P. M. having 48 lenses mounted thereon, which produce the above referenced optical rectification, when in rotation. It is apparent that due to the nature of the system these lenses must be optically identical within very small tolerances and must be mounted on the lens wheel with great precision in order to maintain the requisite precise registration of the successive superimposed film images and also to avoid picture unsteadiness and periodic wandering of the projected image.

Certain improvements over the lens wheel system in combination with a television image optical pickup tube were realized when the principle of optical reversibility was applied to the optical system and flying spot scansion methods employed. In such arrangements an illuminating flying spot scanning pattern or raster is produced at the plane where the motion picture frame image would normally be projected with the result that upon the motion picture film itself appears a reduced-sized scanning pattern suitable for scanning an individual frame on the moving film. Accordingly, a photoelectric cell or other light sensitive device may be placed behind the film strip transparency and as the moving spot describing the film scansion pattern moves over the film area, an electrical signal is produced suitable for television video signal synthesis. The main electrical advantage to be derived from the flying spot technique resides in the reduction in background noise prevalent in most types of electron scanning devices wherein the noise is not constant with applied light intensity. In the flying spot system the use of a photoelectric cell makes possible the production of television image signals having substantially lower noise background level. However, even in the case of 525-line flying spot scanning systems where the frame is scanned to the standard 35 mm. projection aperture height of .600″, the film should be maintained in register with the raster image within .00055″ of nominal or better. Where maximum film shrinkages are as much as 0.4% and sprockets are designed for minimum shrinkage, registration errors occurring at sprocket hole frequency will be as great as 0.2% of sprocket pitch or .187×.002=0.00037″. If maximum shrinkages are greater or less, the registration errors will change proportionately. Sprocket eccentricities of 0.0001″ will add another 0.0002″ to the registration error at sprocket frequency. If these variations are centered on the nominal, they will amount in practice to one-fourth scanning pattern line of error. The foregoing illustrates the orders of magnitude involved and may be somewhat modified when actual design data are considered.

In the case of 16 mm. projection at 525 lines, which is becoming progressively a more popular form of film projection and a 525-line scanning raster is applied thereto, the registration must be accurate to .284/1050 or 0.00027″. For this 16 mm. system, at 0.4% maximum shrinkage, registration errors occurring at sprocket hole frequency will be in the order of 0.0006″. This means that if this error is centered on the nominal, there will be a one-half line raster registration error, although no sprocket eccentricity may exist. This problem is common to all optical projection machines that project motion pictures from a continuously moving film and does not propose to take in consideration all the factors that may cause registration errors such as perforation errors in the film, etc. Thus it is seen that any optical system associated with mechanical means for producing frame scansion of continuously moving motion picture film in television film scanning mechanisms must operate to considerably close tolerances which consequently renders the lens wheel system or any other scheme employing a plurality of closely matched optical elements necessarily expensive and difficult of adjustment. It is to be noted that although the film shrinkage problem may be effectively eliminated by the use of a novel means described in a United States patent application by A. V. Bedford entitled "Film Shrinkage Compensatory System," Ser. No. 44,013, filed August 13, 1948, the exacting degree with which successive film frames cmust be registered still presents difficult mechanical considerations.

The present invention provides a method of film scansion differing from conventional continuous film projectors in that it takes advantage of the flying spot technique in such a way that all optical parts are perfectly stationary during actual scanning. During a given scanning cycle optical rectification of the moving film image is effected by the motion of the flying spot and during intervals between frame scansions a recovery mirror moves to restore the image of the spot to the top of the film frame in its advanced position at the beginning of the next successive scan. In this system the flying spot describing the scanning raster or pattern is conveniently produced on the face of a kinescope or similar type of electron-optical reproducing tube. In one of the preferred forms of the present invention, in order to return the flying spot image in the very small fraction of a second corresponding to the vertical field blank-out portion of a television signal to its starting point on the film frame at the beginning of each vertical scan without moving the recovery mirror at high accelerations, a portion of the optical path provided between the flying spot scanning pattern and the film frame is divided into two branches which are mirror images of each other, each branch containing a reset or recovery mirror. A shuttering device included in each optical branch operates to bring the two branches into effect alternately for periods of approximately 1/60 of a second corresponding to the television field vertical repetition rate. The recovery mirrors are moved alternately by a cam or cams that have alternate dwell and lift periods of a 1/60 of a second each. According to the technique of the present invention one branch is blocked by a shutter while its reset mirror is moving between dwells and at the same time the other branch is opened by a shutter while its reset mirror is at dwell, permitting the picture to be scanned by this latter optical branch. The shuttering device then reverses the functions of the two branches during the next scanning cycle, etc. Dwell periods and reset periods may then be made equal for each reset mirror as the effective reset time is the time required for the shuttering device to close one branch and open the other which may be very short and in order of 5% of the 1/60 second scanning cycle. Thus, by this method mechanical acceleration of moving parts in the film scansion system may be held down to conveniently obtainable values with an attendant minimum wear on moving parts.

It is therefore a purpose of the present invention to provide a television film scansion system for continuously moving motion picture film wherein rectification of film frame motion is entirely electronic such that all optical parts or members involved in the scansion of a particular frame are held stationary during the actual scanning cycle.

Another object of the present invention resides in the provision of a flying spot scanning system for continuously moving motion picture film wherein the film shrinkage may be compensated electronically by slight adjustment of the slope of the flying spot scanning raster to correspond to changes in film velocity that are caused by said shrinkage variations.

It is further a purpose of the present invention to provide a film scansion device for television transmitting apparatus in which high precision mechanical construction details may be confined to one or at most to two identical cam structures.

It is further an object of the present invention to provide a film scansion system for television applications in which optical compensation for any film movement is accomplished through a plurality of properly shuttered alternately operative and inoperative optical paths having included in each path a movable corrective mirror which compensates for said film motion during the inoperative period of its associated path.

It is further a purpose of the present invention to provide a television film scansion system for motion picture film in which all optical parts can be mounted to permit individual adjustment of each for optimum performance.

Another object of the present invention resides in the provision of an electromechanical optical film scansion system for continuously moving motion picture film in which mechanically obtained optical rectification of film strip motion is controlled by at least one continuously rotating cam having relatively non-critical lift segments and precision dwell segments.

The novel features which are believed to be characteristic of the present invention are set forth in the appended claims. The invention itself, however, as to both its organization and methods of operation will best be understood through reference to the following description, especially when considered in connection with the accompanying drawings wherein, Fig. 1 illustrates a section of motion picture film of a type suitable for use in the practice of this invention;

Figures 1, 2:
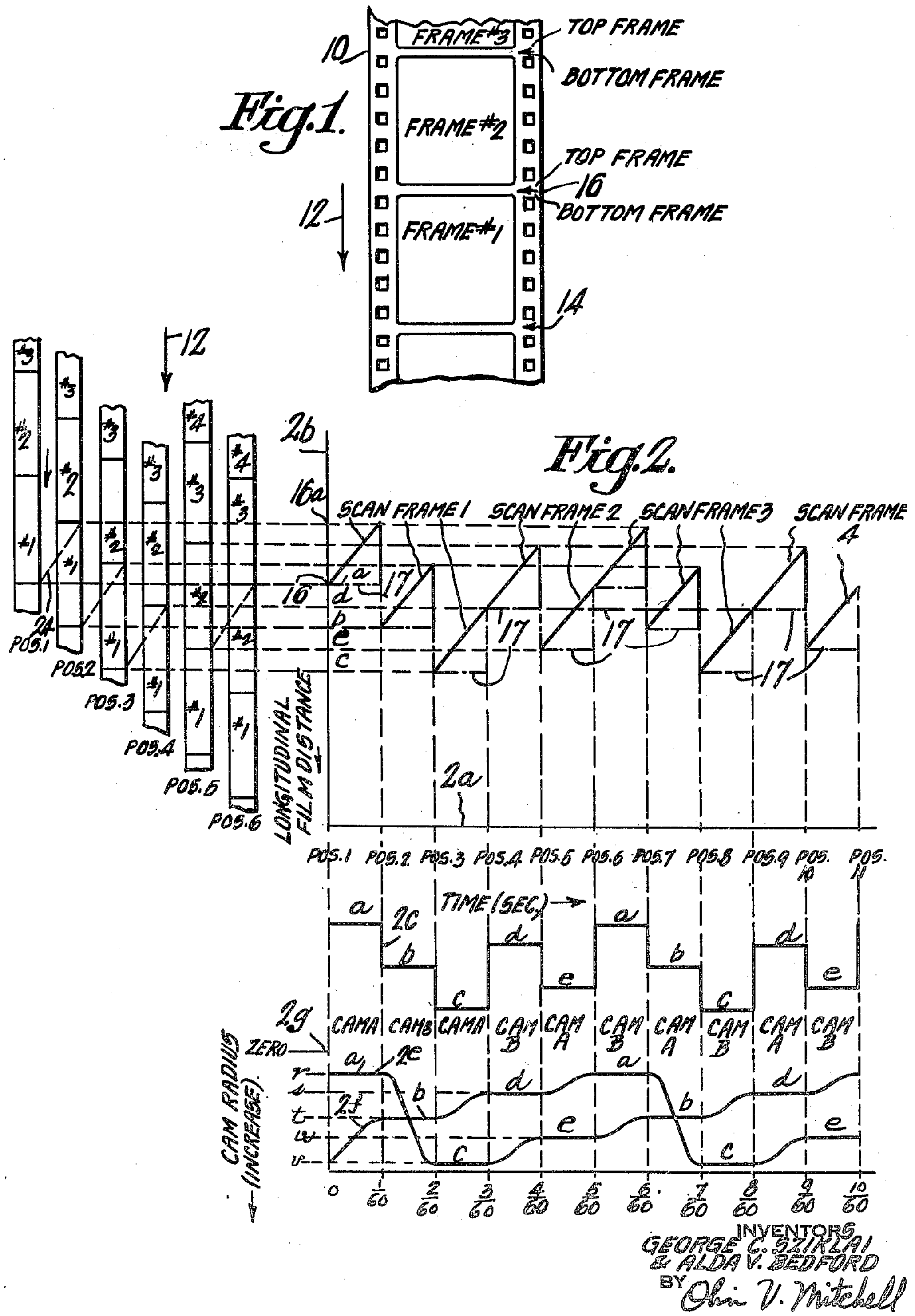
Fig. 2 is a graphical representation of a few mechanical considerations useful in deriving the characteristics of certain control cams involved in one form of the present invention.

The standard form of motion picture film, used in the motion picture art and consequently most abundantly available for television program material use has successive frame images oriented in a manner similar to that illustrated in Fig. 1. Here a section 10 of a strip of motion picture film is shown, with an indication (arrow 12) of the direction of film motion, as it would normally be made to pass projection film gate. Due to the optical inverting qualities of the projection lens system employed in most projectors, it is well known that the individual frames as they pass the projector aperture in front of the projection lens are purposely inverted. Therefore, the top of the image recorded on frame 1 of film strip 10 will be at the position indicated by arrow 14, labeled "top frame #1," correspondingly, the position indicated by arrow 16 relates to the bottom of the image included in frame 1 and also the top of the image of frame 2. Hence, as the film moves in the direction indicated by arrow 12, it is apparent that, for continuous non-intermittent type of film projection, the top of each successive frame is exposed for projection before the bottom of each respective frame. This observation, although somewhat elementary and well known, has been made in an effort to ensure clarity in the comprehension of the film optical rectification system now about to be described.

Figures 3, 9, 10:
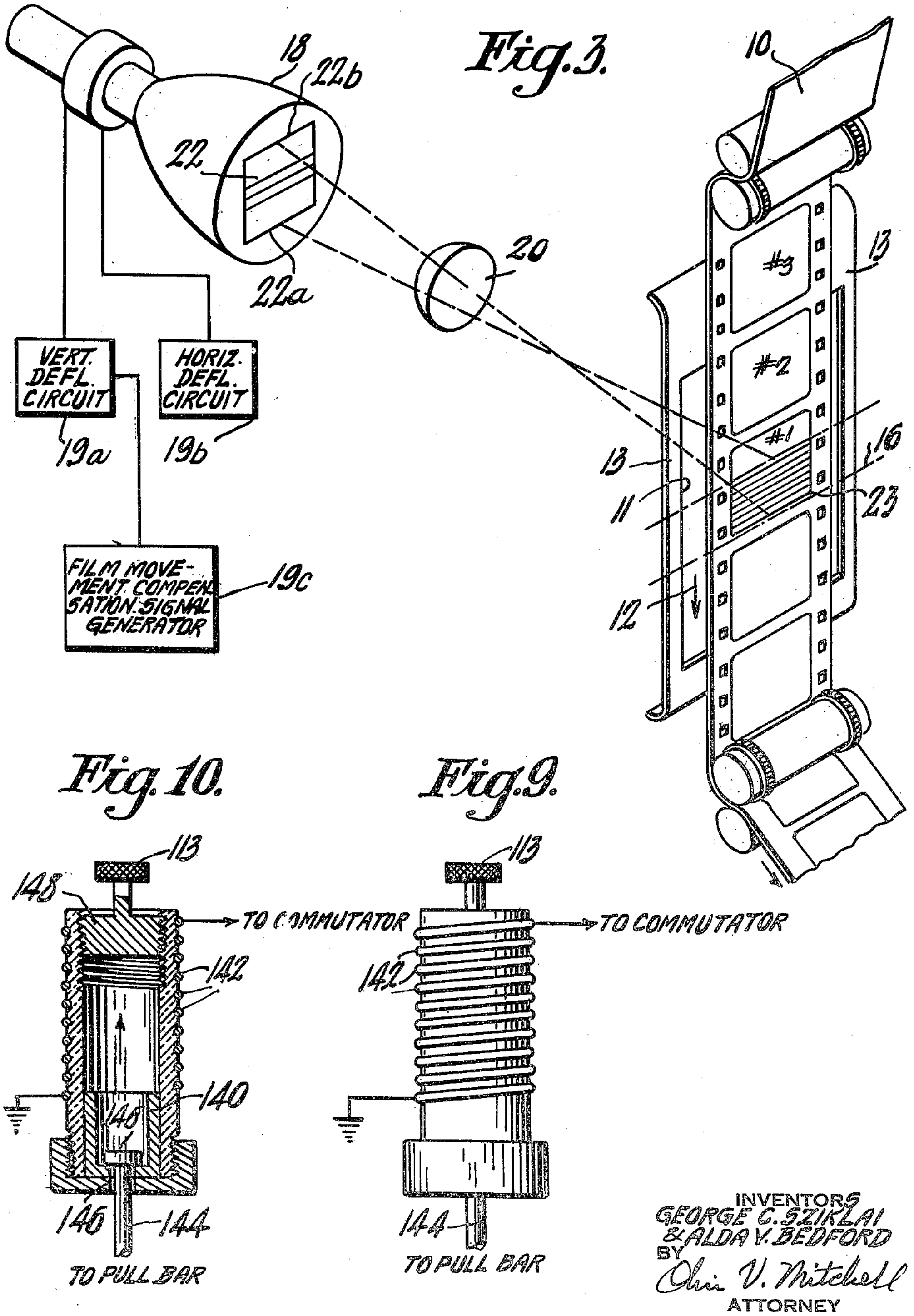
Fig. 3 represents a basic motion picture film scansion system.
Fig. 9 is an elevated view of a control solenoid employed in the embodiment illustrated in Fig. 8.
Fig. 10 is a cross sectioned view of the solenoid shown in Fig. 9.

Turning now to Fig. 2 and Fig. 3, the film section 10 is shown in successive displacements indicated by positions 1, 2, 3, 4, 5, and 6, (Fig. 2), as it would pass a projection aperture such as 11 in Fig. 3 with motion in the direction of arrow 12 indicated thereon. An arbitrary dotted reference line 16 is indicated in Fig. 3 as located on the film image plane of the projection gate 13. It will be assumed that the film is to be scanned by a flying spot form of scanning raster which is conveniently produced by a cathode ray tube such as 18 activated by appropriate sweep circuits 19*a*, 19*b*, the vertical deflection being modified by the apparatus represented at 19*c*. The light from the raster 22 so produced passes through a projection lens system 20 to project on the film 10 an image 23 of the stationary scanning raster 22. The vertical level corresponding to the reference line 16 shown in Fig. 3 is also indicated in Fig. 2 at its position along ordinate 2*b* which graphically represents longitudinal film distance as it passes the gate 13. In position 1 (Fig. 2 and Fig. 3), the initial or starting position of the projection cycle about to be described, the film frame 1 is shown just prior to crossing the reference level 16, at which level the starting point or spot on the scanning raster 22 is imaged by proper orientation of the kinescope 18 with respect to the lens 20. This orientation is further characterized in that the top line of the scanning raster, indicated at 22*a*, will not only have its genesis on the reference level 16 but the bottom line 22*b* of the scanning raster will have its projected genesis at a discrete level 16*a* displaced longitudinally from level 16 on the film image plane. If now film 10 is made to pass reference level 16 in Fig. 3 at a continuous (non-intermittent) rate of 24 frames per second and the scanning pattern 22 is produced at a rate of 30 complete frames per second (for interlaced systems, 60 interlaced fields per second), it will be evident to those skilled in the art that the required conversion from 24 frames per second to the 30 frames per second scanning system may be made by simply scanning successive and alternate motion picture image frames three and two times respectively. That is, film frame 1 may be scanned three times while film frame 2 will be scanned only twice, correspondingly, film frame 3 will be scanned three times and film frame 4 scanned only twice, etc. Under these conditions, the projected size of the scanning pattern 22 on the film image plane will need only be $\frac{3}{5}$ of a longitudinal frame dimension, which means that the distance between reference level 16 and level 16*a* is properly only $\frac{3}{5}$ of an individual frame height.

Referring now again to Fig. 2, as the film progresses in the direction of the arrow 12 concurrently with the progression of the flying spot in describing the scanning raster field 22, it is apparent that the film frame 1 will have been completely scanned during the interval between position 1 and position 2. This action is indicated by a dotted line 24 which represents by the longitudinal distance between its extremities the vertical height of the scanning pattern image as projected on the film during its transition from position 1 to position 2. Since it is assumed that a 30 frame per second interlaced scanning raster is being utilized it follows that this scanning action of frame 1 must be done in 1/60 of a second. Accordingly, the abscissa 2a of the graph in Fig. 2 (on which abscissa are described equal scansion intervals of 1/60 of a second) cooperates with the ordinate 2b (depicting relative position of the scanning raster 22 as projected on the film) to show that at the end of first 1/60 of a second interval, film frame 1 has been scanned once. The film now has moved from position 1 to position 2 and in order for film frame 1 to again be scanned, the upper frame scansion section or, genesis of the scanning pattern 22 must be dropped to a position b as indicated or ordinates 2b before the first line of the scanning raster is again described by the flying spot. This drop or shift of the image scanning pattern image from position a on ordinate 2b, on which the first scansion of film frame 1 was based, to position b, is the type of function necessary in continuous film scansion which it is the purpose of this invention to most satisfactorily accomplish.

The electron beam image produced by kinescope 18 having now scanned film frame 1 and by a suitable optical means to be provided by the present invention, had its image on the film scansion plane shifted in the direction of the film to a position b to make ready for a second scansion of frame 1, now proceeds to again scan film frame 1 during the transition of the frame from film position 2 to film position 3. Necessarily at the end of this latter second scansion of frame 1, accomplished by the time film position 3 is obtained, in order to again scan film frame 1, the image of the scanning pattern genesis must be again shifted in the direction of the film motion to level c, indicated on ordinate 2b. During the transition of the film from position 3 to position 4, the frame 1 is then again scanned for the third time.

Frame 1 now having been scanned three times, frame 2 is now scanned by shifting the genesis of the scanning pattern image in the direction opposite to film motion up to position d and the scanning continues for the next 1/60 of a second until position 5 is reached. At position 5 this scanning pattern image must be shifted in the direction of motion film to level e in order to make ready for the second scansion of frame 2. This second scansion is appropriately provided during the transition of the film from position 5 to position 6. Hence, at position 6, frame 1 on film 10 has been scanned three times and frame 2 has been scanned twice in a period of 5/60 of a second. Another shifting of the scanning pattern image is now required in a direction opposite film movement to the starting level "a" in order to make ready for the first of the necessary three scansions of frame 3. Since the "three-two" scanning cycle has been completed at position 6, successive scansions of frame pairs, such as 3 and 4, 5 and 6, 7 and 8, etc. may be properly obtained by following the same pattern of operations described in connection with frames 1 and 2, and need not be described more fully.

As hereinbefore mentioned, the necessary shifting of the scanning pattern image to accomplish rectification of film motion must be done during the blank out time of a vertical field blank out interval and corresponds in RMA television practice to a reset time of approximately one millisecond. It is well to here note that systems have been devised for electronically providing appropriate scanning pattern image shift by electrically shifting the position of pattern 22 on the face of the kinescope 18. Such systems are not altogether satisfactory in that the scanning pattern dimensions described on the face of the kinescope change with alteration of its position due to the undesirable variations in deflection sensitivity of the kinescope for different beam positions.

Figures 4, 5:
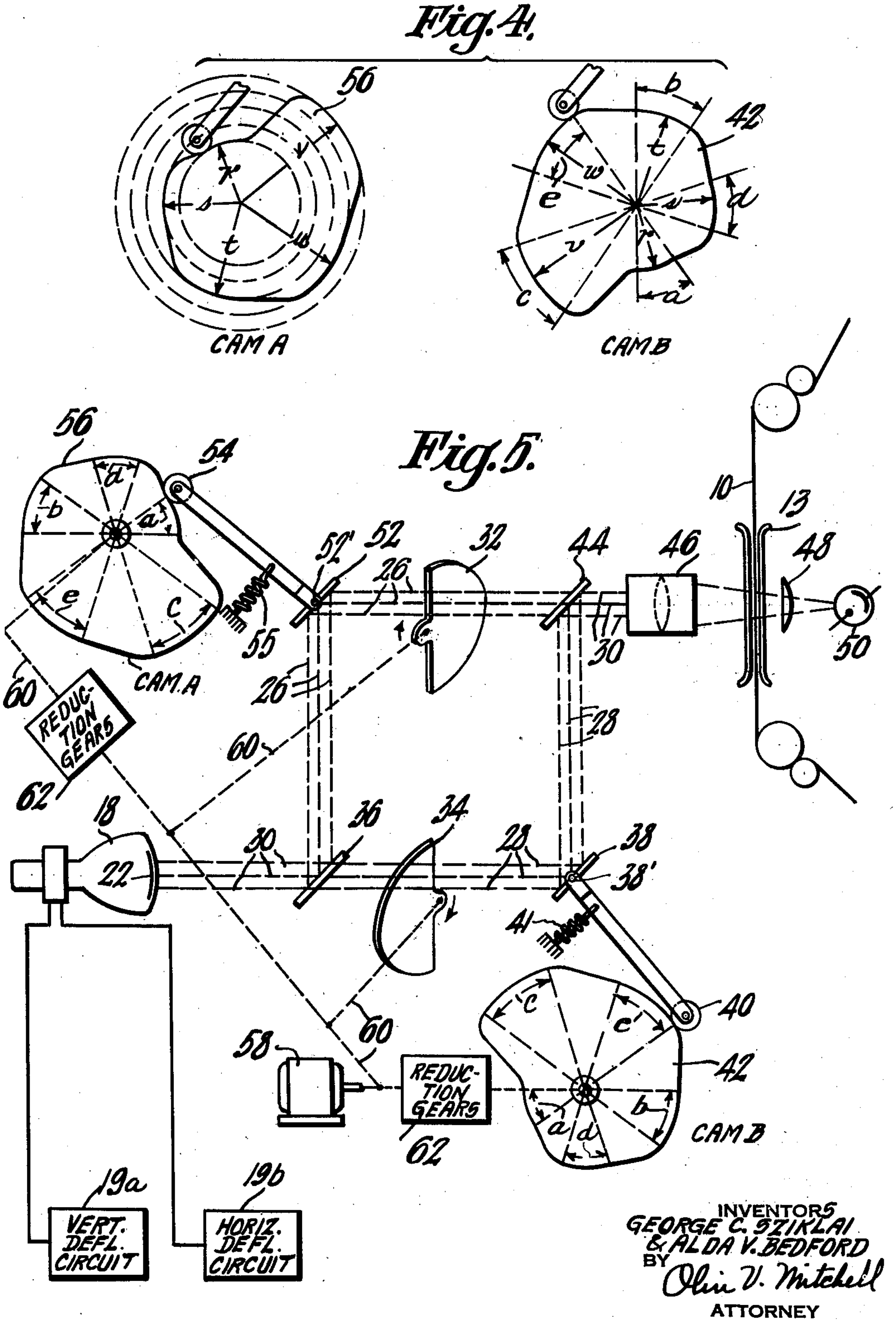
Fig. 4 illustrates one form of control cam contour useful in the embodiment of the present invention.
Fig. 5 represents an embodiment of the present invention.

Therefore, turning now to Fig. 5, in accordance with the present invention the kinescope 18 is shown producing a stationary pattern 22 which may be imaged on the film 10 by either of dual optical paths 26 and 28, said optical paths having in common that section indicated by index 30. Shutters 32 and 34 are respectively placed in optical paths 26 and 28 for the purpose of inactivating these paths during appropriate time intervals. Stationary semi-silvered mirror 36 allows half of the light rays derived from the kinescope 18 to pass along optical path 28 to be deflected by rocking mirror 38 which is angularly positioned by cam follower 40 acting upon the periphery of cam B shown at 42. The image of the scanning raster as deflected by mirror 38 then passes on to another stationary semi-silvered mirror 44 which is normally oriented to allow the light rays from mirror 38 to be reflected through the lens system 46 and to project, on the film 10, an image of the scanning raster 22 developed by the kinescope 18. The light after passing through the film transparency is then collected by the lens 48 and allowed to act upon a photoelectric cell 50 which is appropriately connected to develop a video signal as the flying spot comprising the raster 22 scans the film frames. It is to be noticed that by changing the angular position of rocking mirror 38, the longitudinal positioning of the scanning raster image on the film 10 may be altered.

An image of the scanning raster 22 may be also conveyed to the film 10 (see Fig. 5) by the alternate optical path 26 which includes rocking mirror 52. Mirror 52 reflects the image through the semi-silvered mirror 44 and hence on to the film 10 though the lens system 46. The longitudinal positioning of the image from this path on the film is of course alterable by the angular positioning of the rocking mirror 52 occasioned by the action of cam follower 54 acting on the periphery of cam A, indicated at 56.

Now according to the present invention shutters 32 and 34, adapted to conditionally render effective the respective optical paths 26 and 28, are mechanically driven in synchronism with the control cams A and B from the driving motor 58, such mechanical linkage being indicated by dotted line 60. As will be seen later, cams A and B although being driven in synchronism with the shutters 32 and 34, are preferably rotated at a reduced speed of one-fifth that of the shutters 32 and 34. This speed reduction may be accomplished through suitable gear reduction trains indicated by boxes 62. Shutters 32 and 34 are so phased with respect to the cams A and B that the respective light paths 26 and 28 in which the shutters are placed are rendered ineffective for the time interval during which the cams are altering the position of the rocking mirror included in that path. Thus, during the time that the shutters 32 and 34 alternately render effective the optical paths 26 and 28, the corresponding rocking mirrors 52 and 38 included in the respective optical path is held stationary through action of the cam followers 54 and 40 operating on a "dwell" or constant radius portion of the cam periphery. The development of suitable control surfaces for the cams is shown in connection with the time base 2*a* of Fig. 2 and the beforementioned graphic representation of scanning pattern image location depicted by the ordinate 2*b*. The graphical construction for an individual cam periphery in connection with the abscissa 2*a* and ordinate 2*b* is shown by curves 2*c*, 2*e*, and 2*f*, of Figure 2 with the resulting developed cam surfaces and the proper operational phase displacement illustrated in Figure 4.

Considering now the requirements for the control cams A and B, by reference to Figure 2 it is seen that during the transition from position 1 to position 2 of the film 10, the rocking mirror associated with the optical path transmitting the scanning pattern image to the film for scansion thereof, must necessarily maintain a constant relative angular displacement. We may arbitrarily choose the rocking mirror 52 pivoted to rotate about its axis 52' through the action of cam follower 54 held against the cam A surface by spring 55 to handle the scanning pattern for frame 1. It then follows that the radial distance from the rotating axis of cam A 56 to the axis of the follower 54 during the transition from position 1 to position 2 of the film, must remain constant if the rocking mirror 52 displacement is to be held constant. Consequently, this constant radius surface of the cam is conveniently assigned the letter "*a*" and the continuation of this surface or radial level, "*a*" through the transition from position 1 to position 2 is indicated by the dotted line 17 in cooperation with the time base 2*a*. For the next scansion interval, as has been described, the image must be shifted to a level corresponding to "*b*." In accordance with the present invention, the peripherial constant radius cam surface for this new image positioning is provided by cam B which in Figure 5, which has been in a state of transition from cam surface "*e*" to cam surface "*b*" during the aforementioned scansion of the film while moving from position 1 to position 2. The scanning pattern image must be shifted to another level "*c*" when scansion of the film is accomplished during the transition from position 3 to position 4 and this level "*c*" will be established by cam A.

During the scansion of the film between position 2 to position 3 the cam A has undergone a change in radius from surface "*a*" to surface "*c*," the shutter 32 associated with that optical path being closed, of course, during transition. This alternation from cam A to cam B is continued for the scanning of the motion picture film frame 2 at the subsequent levels "*d*" and "*e*" these levels being established by suitable radial surfaces on the cams A and B.

For ease in showing the sequential levels of image shift employed during the scanning of the film, the dotted line curve 17, Figure 2, has been redrawn in solid line form by curve 2*c* and is properly oriented with respect to the time base 2*a*. The curve 2*e* is a further development of the control surface for cam A only showing that for the first one-sixtieth of the second cam A is constructed to maintain the required constant radius surface "*a*," while during the following 1/60 of a second cam A undergoes a change in control surface from the level A to the level "C." Correspondingly, curve 2*f* is a development for the surface of cam B and shows that while the peripherial surface of cam B is in a transitional state during the first 1/60 of a second, a constant radius level "*b*" is established for use during the second 1/60 of a second. Parenthetical notations corresponding to the time intervals indicated by abscissa 2*a* are presented in Figure 2 to further designate the particular cam that is in action to establish a constant angular displacement of its associated mirror for that particular time interval.

With the arrangement shown in Figure 5, it is evident that an increase of radius in the control cam causes a shifting of the beam in the direction of film motion. Referring to Figure 2*a*, it is required that the successive levels "*a*," "*b*," and "*c*" during the three scansion intervals of frame one are successive pattern image shifts in the direction of film motion. Consequently the radii of the cams A and B must alternately present to their associated mirrors the effect of a successively increasing radius during the three scansions of frame 1. A similar observation may be made of cam requirements for the scansion of frame 2 wherein the scanning pattern image is shifted from level "*d*" to level "*e*" which is also a shift of the image in the direction of film motion. In order to interpret the curves 2*e* and 2*f* in terms of cam radius, the ordinate 2*g* has been established adjacent to the curves. The uppermost extent of this ordinate 2*g* represents zero radius, while the lowest extent (*v*) of the abscissa represents the maximum radius of the cam. It is noted that for sake of simplicity, it has been assumed that the lever arms translating the motion from the control cams to the rocking mirrors are of equal effective length and that other physical arrangement of the apparatus is such to permit making the radial dimensions of cams A and B identical. Thus, surface "*a*" of cam A may be thought of as being obtained by a radius "*r*" of the cam, while the surface "*a*" of cam B may be also established by a radius of the same dimension namely "P." This relation is most extent of this ordinate 2*g* represents zero cam B are shown in detail. Successively increasing radii "*s*," "*t*," "*u*," and "*v*" will then correspond to peripherial surfaces "*d*," "*b*," "*e*" and "*c*" of the control cams. Although Figure 5 suggests the use of 2 cams, it is deducible from the illustrated necessary 180° relationship of the cams in Figure 4 and Figure 5, that a single cam could be used with the necessary followers operating on its peripherial surfaces and suitable mechanical linkages connected between the followers and the rocking mirrors 52 and 38. It may also be desirable to combine shutters 32 and 34 into a single shutter disposed to alternately interrupt optical path 26 and 28 for successive periods of 1/60 of a second. It is noted also that in the construction of the control cam the left sections of the cam between consecutive constant radius peripherial surfaces, may be made to display any convenient contour as the only critical constructional aspects of the cams reside almost wholly in the determination of the constant radius surfaces *a*, *b*, *c*, *d* and *e*.

Figures 6, 7:
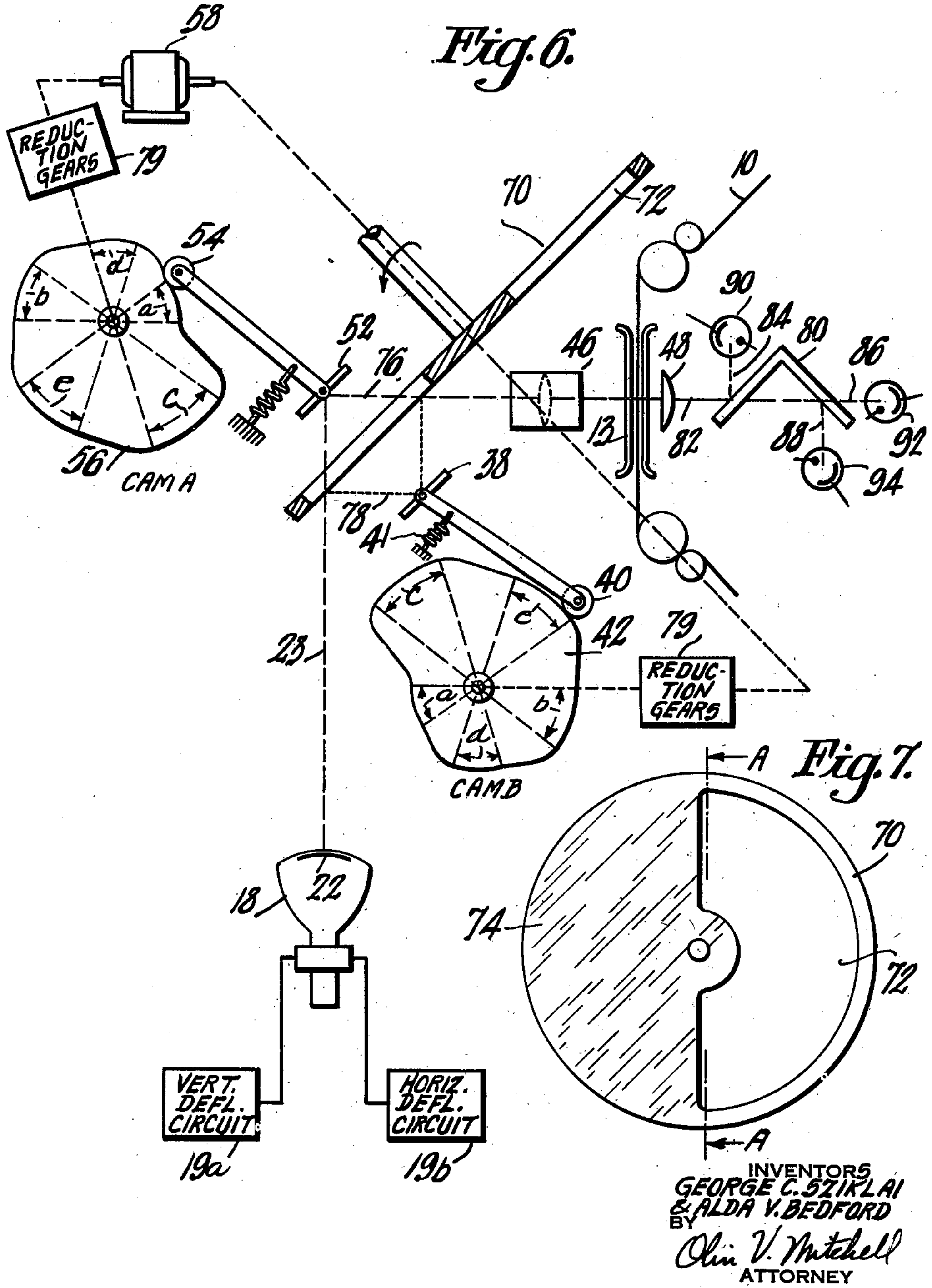
Fig. 6 represents another embodiment of the present invention.
Fig. 7 illustrates one form of shuttering element employed in the embodiment shown in Fig. 5.

A novel adaptation and simplification of the arrangement shown in Figure 5 may be accomplished as illustrated in Figure 6 to provide not only increased economy, but increased light efficiency. In Figure 5 it is apparent that only 1/4 of the light produced by the kinescope 18 is theoretically available to the photocell 50. This is considering semi-silvered mirrors 36 and 34 as reflecting 50% of the incident light and transmitted 50% of the incident light. Other factors, of course, are active to reduce the light reaching the photocell 50 but are not concerned with the advantages to be derived from the arrangements shown in Figure 6. In this improved optical arrangement a single shutter 70 shown in more detail in Figure 7 has an aperture 72 established therein for permitting transmission of light and an opaque section 74 which prevents transmission of light. The cross sectional view of the shutter in Figure 6 is taken on the line A—A of Figure 7. The crosshatching on the opaque sections of 74 indicates that this surface of the shutter is also treated to act as a mirror, thus, not only being opaque but highly reflective. The image 22 on the kinescope 18 is then made available to the projection lens 46 by two optical paths 76 and 78. In a position where the aperture 72 is just being presented to the light rays 23 produced by a kinescope 18, and represents the identical phase of the apparatus depicted in Figure 5, the rocking mirror 52, actuated as in Figure 5 by cam A, begins its dwell period on surface "*a*" of the cam and permits the image of the scanning raster 22 to effect the first scansion of frame 1 of film 10. After scansion of frame 1, the mirror-shutter 70 will have then rotated 180° to present the opaque mirrored surface to the rays 23 produced by the kinescope. The optical path 76 shown in dashed lines will be rendered ineffective, while the optical path 78, shown in dotted lines, will be established. Optical path 78 includes rocking mirror 38 which is operated by cam B as described in Figure 5 and the rocking mirror 38 will be maintained at a constant angular displacement by the constant radius surface "*b*" required for the second scansion of frame 1 in accordance with Figure 2.

Again, in this latter arrangement, cams A and B are driven at a reduced speed of ⅕ that of the shutter 70 by means of gear boxes 79. A dichroic mirror 80 is shown in Figure 6 to indicate that this system may be easily applied to the transmission of colored television motion picture program material. The action of the dichroic mirror such as 80 to break up the incident light rays 82 into the component primary color rays 84, 86, and 88 is well known to the art and is fully described, for example, in a United States patent application filed by Ray Kell and George C. Sziklai entitled "Simultaneous Color Television," Ser. No. 716,256, filed December 14, 1946, now Patent No. 2,560,351, granted July 10, 1951. Accordingly the photocells 90, 92, and 94 are disposed to respond to the primary color component 84, 86, and 88 respectively and as such provide the signal sources for the respective color channels.

Figure 8:
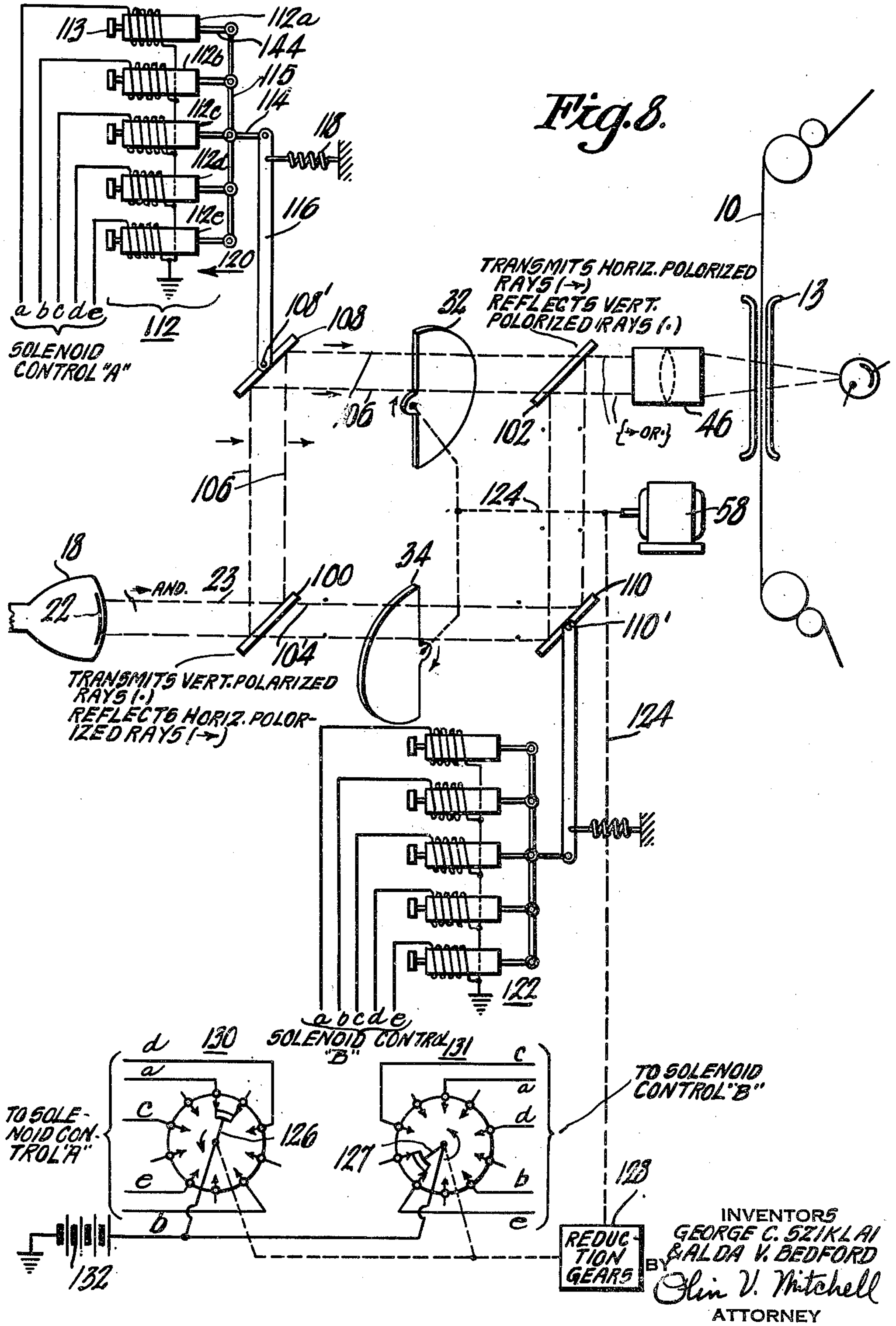
Fig. 8 shows another form of the present invention.

Although the present invention lends itself conveniently to the use of cams for controlling the angular position of the rocking mirrors, it may be more expedient in some instances to control the angular displacement of the mirrors by other means. Figure 8 illustrates one method of electromechanically controlling the rocking mirrors by means of a series of properly actuated solenoids each of said solenoids being adapted to provide a predetermined displacement of the mirror position. This arrangement in Figure 8 also employs another method of increasing the optical efficiency of the system over that shown in Figure 5 and replaces the stationary semi-silvered mirrors 36 and 44 of Figure 5 with stationary polarizing mirrors 100 and 102.

These polarized mirrors 100 and 102 are constructed to transmit all light polarized in one direction and to deflect all light polarized in the opposite direction. Specifically, mirror 100 may be designed to transmit vertically polarized rays and to reflect horizontal rays while mirror 102, the companion to mirror 100, transmits horizontally polarized rays and reflects vertically polarized rays.

The operation of the embodiment of Figure 8 is from a functional standpoint substantially the same as that described in Figure 5 such that the shutters 32 and 34, driven directly by motor 58, are disposed to alternately interrupt the optical paths with which they are associated. In this case the image 22 on the face of the kinescope 18 is made available to the projection lens 46 by either optical path 104 or 106. Path 106 being that of horizontally polarized rays while that of 104 being that of vertically polarized rays. The light rays 23 emanating from the face of the kinescope 18 are considered to be non-polarized light having both vertical and horizontal components. These rays upon encountering the polarizing mirror 100 are broken up into their vertical and horizontal components. The vertical component being transmitted through the mirror to constitute optical path 104 while the horizontal component is reflected to operate through optical path 106. The rocking mirrors 108 and 110 are the respective counterparts of rocking mirrors 52 and 38 of Figure 5 and Figure 6 and by suitable displacement can be made to appropriately shift the image as conveyed by the optical path with which they are associated, longitudinally on the film 10. Since the mirror 102 transmits horizontally polarized rays with negligible attenuation, the light rays along path 106 may freely pass through the mirror on to the projection lens 46 with very little light loss. Similarly, the vertically polarized rays by optical path 104, are totally reflected by mirror 102 and hence suffer a minimum of reduction.

The rocking mirrors 108 and 110 are respectively pivoted about their axes 108′ and 110′ through the action of solenoid control A and B. The bank of solenoids 112 comprising solenoid control A acts through the mirror actuating arm 114 so as to pull the lever arm 116 in a direction toward the solenoids and against the spring 118. Each of the solenoids 112 when actuated, displaces the lever arm 116 a predetermined discrete amount in the direction of the arrow 120. Therefore solenoid 112*a* may be adjusted so that upon energization, it will cause an angular displacement of the mirror 108 corresponding to the angular displacement of mirror 52 in Figure 5 when the cam follower 54 therein was acting on surface *a* of cam A. Accordingly, solenoid 112*b* may cause angular displacement of mirror 108 an amount corresponding to the angular displacement of mirror 52 in Figure 5 when the cam follower 54 acted upon surface *b* of cam A. The solenoids 112*c*, 112*d* and 112*e* may be also adjusted to produce angular deflections of the mirror 108 which correspond to the required angular deflection as would be produced by a cam follower acting upon the surfaces *c*, *d* and *e* of the control cams in Figure 5. The solenoid bank 122 is similarly constructed to bank 112 to effect equivalent deflections of mirror 110. Thus, it is only necessary to provide sequential energization of the individual solenoid windings in the solenoid banks 112 and 122 to produce the proper deflection of the scanning pattern image as described in Figure 5 and Figure 6.

The energization of the solenoid windings of each bank of solenoids must be done in an asynchronous manner with respect to shutters 32 and 34. Referring to Figure 5 and Figure 6, it is seen that rocking mirror 52 through the action of the cam A assumed successive angular positions corresponding to the cam surfaces *a*, *c*, *e*, *b*, and *d* and these surfaces acted upon the mirror in the order just mentioned. Therefore in Fig. 8 the motor 58 which drives the shutters 32 and 34 through a mechanical linkage indicated by a dotted line 124 is also adapted to provide drive, through a gear reduction box 128 to the armatures 126 and 127 of electrical commutators 130 and 131 respectively. The motion imparted to the armatures 126 and 127 is a counterclockwise direction as indicated by the arrow thereon. A source of actuating potential 132 is connected with ground potential and the armatures of the commutators 130 and 131 so that suitable actuating potential is successively applied to the peripherial contacts of the commutators as the armatures are rotated. It is noted that the connections to the commutator 130 from the solenoid control A bank 112 are such that the solenoids in the bank 112 are successively energized to produce deflection of the mirror 108 in accordance with the sequence *a*, *c*, *e*, *b*, and *d*. These letters corresponding, as beforementioned, to the surfaces of cam A in Figure 5 and Figure 6. Solenoid bank 122 is similarly activated by the commutator 131 in the same sequence *a*, *c*, *e*, *b* and *d*, however, displaced in occurrence by exactly 180° with respect to the commutator 130. The periods corresponding to the time interval between successive dwell periods described in connection with the cams A and B in the previous embodiments, are simulated by the arrangement shown in Figure 8 through the provision of suitable delay periods between the active commutator contacts on the commutators 128 and 129. For ease in demonstrating the equivalency of the electromechanical action obtained in Figure 8 to the mechanical action obtained in Figures 5 and 6, unused dead contacts between active commutator contacts have been illustrated. It is clear that in practice these contacts would not be required and that furthermore a single commutator with a properly constructed armature could be employed in lieu of the two separate commutators shown.

Adjustment of the amount of displacement of each of the solenoids in Figure 8 may be accomplished by adjustment screws such as in 113 shown in connection with solenoid 112*a*. If for any reason the required displacement produced by the individual solenoids should not be obtained due to wearing of the parts, the subsequent lack of registration of successive frame scansions may be readily corrected by the slight necessary adjustment of a control screw such as 113.

In Figure 9 and Figure 10 are respective elevational and cross-sectional views of a form of adjustable solenoid useful in connection with solenoid banks 112 and 122 in Figure 8. The solenoid shown for example may be considered as a more descriptive view of the solenoid 112*a* shown in Figure 8. The armature 140 of the solenoid moves upwardly in the direction of the arrow upon energization of the winding 142. A connecting pin 144 is provided to couple the motion of the armature 140 to the pull bar 115 shown in Figure 8. This pull bar is shown to be common to all the connecting pins such as 144 of the solenoid 112*a*. It will be observed that the enlarged head 145 of the connecting pin 144 acting in cooperation with the armature hole 146 produces a motion rectifying action whereby upon actuation of the solenoid, the armature 140 moving in the direction of the arrow, positively pulls connecting pin 144 in the same direction. The amount of displacement of the driving pin in the direction of the arrow will depend upon the position of the adjustable threaded closure 148 within the solenoid. However, should the connecting pin 144 be required to move upwardly in the direction of the arrow an amount in excess of that defined by the stopping closure 148 due to the action of other solenoids connected with the pull bar 115, it is free to do so since it is constructed to freely slide within the armature hole 146. Accordingly adjustment of the amount of individual displacement provided by a number of solenoids of this type connected as shown in Figure 8 may be altered by means of knob 113 connected with the stop closure 148.

In the practice of the present invention it may be desirable to place the deflecting mirror system between the projection lens such as 46 (in Figures 5, 6 and 8) and the film 10. This arrangement offers some advantages, one of which is the rendering of the quality of the transmitted picture independent of the geometric distortion of the projection lens. In addition it permits reducing the size of the rotating shutter or shutters. However, a disadvantage of this alternate arrangement is that separate systems must be used for 33 mm. and 16 mm. film which necessarily adds to the equipment cost necessary to offer program service from both sizes of film. A more serious drawback to be derived from the use of a deflecting mirror between the projection lens and film, is that the angular aperture of the projection lens employed is limited irrespective of the shutter size employed. This limitation arises from the difficulty encountered in accommodating the mirror systems in the relatively small amount of space normally available between the lens and film and also arises from the lack of image sharpness introduced by the normal curvature of the film gate in conjunction with the limited depth of focus of the lens. In the case where the mirrors are located between the tube and the lens, to obtain optimum image sharpness, it may be required to give the film a cylindrical curvature equal to the distance between the rocking mirrors and the scanning pattern on the tube. Whereas if the mirrors are orientated between the lens and the film, the film must be given a radius of curvature equal to the distance between the rocking mirrors and the film. In other words, in the first case the film must be convex with respect to the lens while in the second case concave. Since the field of the lens may be assumed to be flat, this curvature itself introduces a certain degree of unsharpness lens of the scanning raster when the raster is sharply focussed on the film for the center of the pattern and this lack of sharpness becomes of increasing importance if the radius of the curvature is small and/or the relative aperture of the lens is large.

In order that the present system as described in Figures 5, 6, and 8 render acceptable performance according to present day television standards, certain tolerances in the characteristics and physical configurations of the related parts may be here considered an aid in reducing to practice the applicant's invention. In the case of 35 mm. film the image 23 in Figure 3 of the scanning raster 22 should have the dimensions of 1 inch x .045 in. and for 16 mm. film projection should have the dimensions of .4 in. x .018 in. It is noted that the last figures in each of these dimensions corresponds to 3/5 of the frame height of the corresponding film frame, this in turn being based upon the scansion of the film at a rate of 60 times per second while said film is being presented for scansion at a rate of 24 frames per second. The lens 20 must have the resolution normally required of a projection lens employed for television purposes and in addition, must have less distortion than one one thousandth of a film height or .07 per cent of the utilized field diameter. The angular displacement tolerance of the rocking mirrors is necessarily equal to plus or minus the ratio of a half line of a standard 3 in. x 4 in. scanning pattern divided by the optical distance from the center of the rocking mirror to the center of the pattern on the flying spot tube. In general, the permitted number of interference fringes exhibited by the reflecting mirrors is obtainable by dividing the angular tolerance by one-half a wave length of sodium light.

In an experimental arrangement patterned after the embodiment illustrated in Figure 6, a satisfactory scansion of the film 10 was realized by producing a 4 in. x 1.8 in. scanning pattern 22 on the screen of the kinescope 18. This pattern after being reflected by the rocking mirror system was then projected by the lens 46 onto the film 10 through an aperture in the film gate of 1 in. x 1.05 ins. for 35 mm. film or .4 in. x .024 in. for 16 mm. film. The focal length of the lens 36 was 3 ins. with an aperture of F 4.5 for the 35 mm. adaptation and was changed to a lens having a focal length of 1.36 ins. with an aperture of F 2 for projection of 16 mm. film. The rocking mirrors 52 and 38 were found to provide adequate light reflection area when made 2 ins. x 1.3 ins. each and permitted an angular tolerance of .4′ in positioning. The total optical distance from the lens 46 to the kinescope tube face was 13.2 ins. and the diameter of the shutter 70 was 18 ins. The shutter 70 was giving a peripherial speed of 137 feet per second. The angular tolerance in establishing the position of the mirrored shutter 70 was plus or minus .4′. The overall optical efficiency of the arrangement was approximately .20 for the 35 mm. arrangement and .27 for the 16 mm. arrangement.

Although specified dimensions operating conditions and orientation of the components useful in one embodiment of my invention have been given relative to a particular arrangement shown for example hereinbefore, it is to be understood the numerical citations and physical specifications were only exemplary and intended to be in no way limiting to the successful practice of the present invention.

From the foregoing detailed description of the method and practice of the applicant's invention taken in connection with the illustration of several preferred embodiments, it is evident that the applicant has provided an improved means for motion picture film scansion as required in television transmission. The apparatus required for the practice of the invention is not only simple and economical of construction, but due to the nature of their functional requirements, admit of high degree of individual precision in the adjustment and maintenance of properly deflected flying spot scanning rasters when applied for scansion of continuously moving motion picture film. Due to novel alternate use of adjustable optical paths disposed for imaging a given scanning raster at different degrees of longitudinal displacement along the axis of the moving film and the transmission between these optical paths being controllable through the use of a properly oriented shutter or shutters associated with the optical paths, the otherwise undesirable but necessary application of high accelerating forces to moving parts within the system is eliminated.

Having now described the invention, what is claimed and desired to be secured by the Letters Patent is the following:

1. A motion picture film scansion device for television systems, said scansion device comprising, in combination, a film feeding mechanism for feeding film longitudinally, means for producing a recurring two dimensional scanning pattern comprising a series of successively illuminated areas, means for defining a plurality of optical paths for conveying and directing the image rays of said scanning pattern to form an image of said scanning pattern on said film, light valve means optically included in each of said paths for conditionally and alternately rendering said paths effective or ineffective, a plurality of optical image diverting devices at least one each being respectively included in each of said optical paths, a mechanical driving system for operating said light valve means, means for separately activating each image diverting device to alter the position of said scanning pattern image as formed on said film by those image rays transmitted by the respective optical path with which each image diverting device is associated, synchronizing means for synchronizing the simultaneous operation of said light valve means driving system and image diverting device activating means such that activation of a given image diverting device to change the projected image position provided by that path is allowed only in that time interval during which the optical path with which said image diverting device is associated is rendered ineffective.

2. A device according to claim 1 wherein the mechanical means separately activating each image diverting device comprises a mechanical linkage between said image diverting devices and a control cam follower acting upon a rotating cam, said cam having appropriate dwell periods during which said image diverting devices remain stationary and said associated light valve device operates to render its associated optical path in an operative condition.

3. A mechanism as defined in claim 2 with the addition of an optical system adapted to receive the light rays from the projected scanning image after having passed through an associated moving film and a photoelectric cell optically associated with said lens system so as to produce signal currents corresponding to the densities of the film areas upon which said scanning pattern image rays are brought to bear.

4. In a film scansion system for television transmitters, the apparatus comprising, in combination, a cathode ray tube having a screen impinged by a deflected cathode ray to provide a substantially stationary illuminated scanning pattern, a film feeding mechanism for feeding film longitudinally, a mechanically alterable optical system coupled with said cathode ray tube providing a multiplicity of optical paths along each of which said illuminated scanning pattern may be imaged on said moving film, at a variety of independently different positions through alteration of the optical system, driving means for said mechanically alterable optical system adapted to alter the position of the scanning pattern image produced by each optical path longitudinally on said film such that successive film frames in the direction opposite from the film movement may be scanned a plurality of times by said illuminated scanning pattern through periodic shifting of said scanning pattern image position in the direction of film movement.

5. A mechanism as defined in claim 4 wherein a mechanical shuttering system is associated with each of said optical paths for successively and cyclically rendered each path inoperative for selected intervals, each interval being at least of sufficient duration to permit any mechanical alteration of said optical path necessary for its next cyclic utilization.

6. The film scanning device for television systems, said device comprising, in combination, a film feeding mechanism for feeding film longitudinally in a scanning surface, means for producing a recurring stationary two dimensional scanning pattern comprising a series of successively illuminated areas, an optical lens system adapted to project an image of said scanning pattern on said scanning surface, means for defining a plurality of optical paths for individually conveying the image rays of said scanning pattern to said scanning surface, a plurality of light valves each respectively associated with one optical path for conditionally rendering the associated light path effective or ineffective to transmit light, a plurality of optical mirrors at least one of each respectively included in each of said optical paths, said mirrors being positioned for directing said scanning pattern image rays onto said scanning surface, mechanical means for altering the angular placement of at least one of said mirrors in each of said optical paths such that the longitudinal position of said scanning pattern image as projected on said scanning plane through a medium of a given optical path is rendered alterable, and means for inter-relating said light valves and said mechanical means for altering the angular placement of said mirrors to synchronize their operation such that a change in position of a mechanically alterable mirror in a given optical path is accomplished only during the time interval in which said optical path is rendered ineffective by its associated light valve.

7. Apparatus as set forth in claim 6 wherein said mechanical means for altering the angular placement of said mirrors comprises one or more rotary cams having peripherial control surfaces which individually activate respective cam followers each of said followers in turn being mechanically connected with one of said mirrors such as to position said mirror according to the displacement imparted to the respective follower by the respective cam.

8. A mechanism as defined in claim 6 in which at least one of said mirrors in each optical path is of the semi reflective polarizing variety by which incident circularly polarized light is divided into two polarization components, the first polarization component being substantially totally reflected but the second polarizing component is substantially totally transmitted.

9. A film scanning device for television systems comprising, in combination, a film feeding mechanism for feeding film longitudinally in a scanning surface, means for producing a recurrent stationary two dimensional scanning pattern comprising a series of successively illuminated areas, an optical lens system for projecting an image of said scanning pattern on said scanning surface, means for defining a plurality of optical paths for conveying the image rays of said scanning pattern to said scanning surface, a mechanically driven light valve associated with each of said optical paths for alternately rendering effective or ineffective the optical path with which each is associated, an optical mirror included in each of said optical paths, a mechanical positioning mechanism for each of said mirrors for altering in a longitudinal direction the position of said scanning pattern as imaged by said optical lens system on said scanning surface, a mechanical linkage synchronizing the operation of said light valves and said mirror positioning mechanism such that said mirror positioning mechanism alters the position of a given optical mirror in a given optical path only during that time interval in which said given optical path is rendered ineffective by its associated light valve.

10. A television film scansion apparatus including a film feeding mechanism for feeding a film longitudinally in a scanning surface at a constant velocity in frames per second, means for producing a stationary recurrent two dimensional scanning pattern comprising a series of successively illuminated areas, means for defining first and second optical paths for conveying and focussing image rays from said scanning pattern onto said scanning surface, a mechanically activated light shutter common to both optical paths for alternately and cyclically rendering each path inoperative for a prescribed interval, an optical ray deflecting device included in each of said paths, mechanical means for independently altering the positioning of each of said ray deflecting devices in each of said optical paths such that the position of said scanning pattern image as projected on said moving film through the medium of each optical path may be longitudinally altered and a mechanical linkage between said mechanically activated light shutters and said mechanically driven ray deflecting devices adapted to synchronize the operation of the former with the latter such that longitudinal alteration of scanning pattern image positioning on said film by means of said ray deflecting members, is effected only in that time interval during which the respective optical path associated with said deflecting member is rendered inoperative by means of its associated light shutter.

11. Apparatus as defined in claim 10 wherein said light shutter comprises an opaque disk having an aperture therein and a light reflective surface thereon such that one of said optical paths is rendered effective by and includes said light reflective surface while the other optical path is rendered effective only by said aperture.

12. A motion picture film scansion device for television apparatus, said scansion device including a film feeding mechanism for feeding a film longitudinally in a scanning surface at a constant velocity in frames per second, a cathode ray tube having a screen impinged by a cathode ray to provide a scansion field having a scanning line spot which produces a stationary two dimensional illuminated scanning pattern comprising a series of successively illuminated areas, means for defining first and second optical paths for conveying and focussing image rays from said scanning pattern onto said scanning surface, a mechanically activated light shutter common to both optical paths for alternately and cyclically rendering each path inoperative for a prescribed interval, an angularly displaceable optical mirror included in each of said paths, first and second control cams each having a suitable cam contour follower with an associated lever arm and connections therefrom with said angularly displaceable mirrors so as to alter the position of each of said mirrors in each of said optical paths such that the position of said scanning pattern image, as projected on said moving film through the medium of each optical path, may be longitudinally altered, and a mechanical linkage between said mechanically activated light shutter and said cams adapted to synchronize the operation of the former with the latter, such that longitudinal alteration of scanning pattern image positioned on said film, by means of said driven mirror members, is effected only in that time interval during which its respective optical path is rendered inoperative by means of its associated light shutter.

13. Apparatus defined by claim 12 wherein said control cams are provided with a peripherial control contours whereby the longitudinal positioning of said scanning pattern image on said moving film is such to provide an odd numbered plurality of lateral scansions of a moving film area to be followed by an even numbered plurality of lateral scansions of a conjugant film area displaced from the previously scanned area in a direction opposite to that of film movement.

14. A motion picture film scansion device for television systems, said device comprising in combination, a film feeding mechanism for feeding film longitudinally along a scanning surface, means for producing a recurrent scanning pattern, comprising a series of recurrently presented illuminated areas, a plural path optical system adapted to project via each path an independent image of said scanning pattern upon said scanning surface, image diverting means in the separate paths of said optical system mechanically alterable to control the positions of each said scanning pattern image upon said scanning surface, a control mechanism for said diverting means for effecting periodic shifting of said scanning pattern images along said scanning surface in the direction of film motion and shutter means for periodically selecting a different one of said optical paths and rendering the remaining path simultaneously closed to light flux such that no more than two successive scansions of a given film area is accomplished over a given optical path.

15. Apparatus according to claim 14 wherein said optical system comprises a plurality of alternate optical paths and wherein said image diverting means is independently active in each of said alternate paths.

16. Apparatus according to claim 15 wherein each of said alternate optical paths is adapted for conditional interruption by at least one opaque shutter.

17. In a scanning mechanism for television systems adapted to scan motion picture film by a light emitting line type scanning raster, the combination of, means for continuously driving a motion picture film along means for defining a scanning surface, a plurality of optical paths for accepting, transmitting and directing image rays from the scanning raster to a focussed position on said scanning surface, ray diverting means in each optical path for independently and controllably establishing the exact position of the focused raster image on said scanning surface as transmitted by that path, shuttering means for successively blocking each optical path for adjacent time intervals of predetermined durations such that only one optical path at any given instant is active to produce a raster image on said scanning surface, means for controlling said ray diverting means, and synchronizing means for holding the action of said ray diverting control means and the action of said shuttering means in a predetermined timing relation whereby each optical path is blocked by said shuttering means during alteration of said ray diverting means by said control means.

GEORGE C. SZIKLAI.
ALDA V. BEDFORD.

REFERENCES CITED

The following references are of record in the file of this patent:

UNITED STATES PATENTS

| Number | Name | Date |
|---|---|---|
| 540,545 | Gray | June 4, 1895 |
| 711,440 | Reichenbach | Oct. 14, 1902 |
| 1,485,195 | Messter | Feb. 26, 1924 |
| 2,218,498 | Bunger et al. | Oct. 15, 1940 |
| 2,225,033 | Condliffe | Dec. 17, 1940 |
| 2,227,054 | Bedford | Dec. 31, 1940 |
| 2,287,033 | Goldmark | June 23, 1942 |

FOREIGN PATENTS

| Number | Country | Date |
|---|---|---|
| 385,194 | Germany | Mar. 14, 1939 |
| 831,567 | France | Sept. 8, 1938 |
| 857,705 | France | Sept. 26, 1940 |